US009660935B2

(12) United States Patent
Gomez

(10) Patent No.: US 9,660,935 B2
(45) Date of Patent: May 23, 2017

(54) SERVER MANAGEMENT CONNECTIONS

(75) Inventor: William Gomez, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1035 days.

(21) Appl. No.: 13/482,533

(22) Filed: May 29, 2012

(65) Prior Publication Data

US 2013/0326033 A1    Dec. 5, 2013

(51) Int. Cl.
*G06F 15/173* (2006.01)
*H04L 12/931* (2013.01)

(52) U.S. Cl.
CPC .................... *H04L 49/00* (2013.01)

(58) Field of Classification Search
CPC ......... H04L 41/00; H04L 41/12; H04L 41/08; H04L 41/0806; H04L 43/00; H04L 41/0803; H04L 49/00; H04L 12/4641; H04L 41/0213; H04L 41/046; H04L 49/356; H04L 49/357; H04L 63/0227; H04L 63/0272
USPC ........................................................ 709/223
See application file for complete search history.

(56) References Cited

U.S. PATENT DOCUMENTS

| 7,330,425 | B1 | 2/2008 | Gulati et al. |
| 7,729,274 | B2 | 6/2010 | Arseneault et al. |
| 7,773,612 | B2 | 8/2010 | Ke et al. |
| 8,650,299 | B1 * | 2/2014 | Huang et al. ................. 709/226 |
| 2002/0112058 | A1 * | 8/2002 | Weisman et al. ............. 709/227 |
| 2007/0263783 | A1 * | 11/2007 | Speranza ..................... 379/67.1 |
| 2008/0228908 | A1 | 9/2008 | Link et al. |
| 2010/0281106 | A1 | 11/2010 | Ashwood-Smith |
| 2011/0040917 | A1 * | 2/2011 | Lambert et al. .............. 710/301 |
| 2012/0294192 | A1 * | 11/2012 | Masood et al. ............... 370/255 |
| 2013/0107872 | A1 * | 5/2013 | Lovett et al. ................. 370/352 |

* cited by examiner

*Primary Examiner* — Christopher Biagini
(74) *Attorney, Agent, or Firm* — Brooks, Cameron & Huebsch, PLLC

(57) ABSTRACT

Systems, methods, and logic are provided for providing a server management network internal to a computing device. Providing a server management network internal to a computing device can include connecting each of a plurality of network interface controllers (NICs) in the computing device to a limited layer network device in the computing device via mutually isolated connections. Furthermore, providing a server management network internal to a computing device can include connecting the limited layer network device to a server management chip in the computing device via a connection isolated from the NICs.

15 Claims, 3 Drawing Sheets

SERVER MANAGEMENT CONNECTIONS

BACKGROUND

A server management chip can be embedded on a service board within a server. The server management chip can be located within a server and can enable a user to remotely perform a number of server functions (e.g., reset the server, power up the server, access server's integrated management log (IML), etc.).

DETAILED DESCRIPTION

Figure 1:
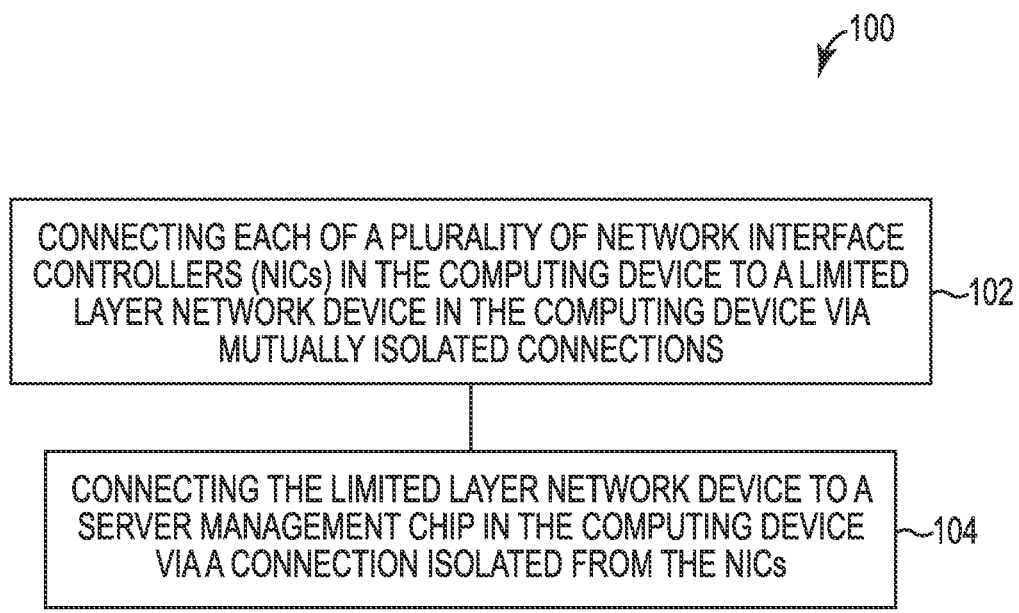
FIG. 1 illustrates a flow chart of an example method for providing a server management network internal to a computing device according to the present disclosure.

A computing device can utilize a server management chip (e.g., integrated lights out, iLo chip, etc.). The computing device can utilize a dedicated port (e.g., Ethernet, Fibre Channel port, etc.) to access the server management chip. If the dedicated port malfunctions there can be a period of time that a user may not have access to the server management chip. For example, a technician may have to repair the dedicated port and/or reboot the computing device before the user can regain access to the server management chip. A server management network can be utilized to access the server management chip via a network multi-path access, if the dedicated port malfunctions without repair of the dedicated port and/or without a reboot of the computing device.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. The present embodiment is not restricted by a number of devices and thus N can represent a positive integer representing the number of devices utilized in a specific application of the present embodiment.

As used herein, "a" or "a number of" something can refer to one or more such things. For example, "a number of ports" can refer to one or more ports. In another example, "a server management chip" can refer to one or more server management chips.

The server management chip can be within a server (e.g., computing server, database server, file server, web server, computing device, etc.) and can have a designated external port (e.g., Ethernet, Fibre Channel port, etc.). The dedicated external port can be utilized by a remote computing device (e.g., computing device other than the server) to access the server management chip. For example, the remote computing device can be communicatively connected via a dedicated Ethernet port to access a set-up utility program of the server management chip.

A server can comprise a number external ports that are not dedicated to the server management chip. For example, the number of external ports can be utilized by a number of remote computing devices to access a service that is provided by the server. According to some examples of the present disclosure, a limited layer network device can be utilized to individually connect each of the number of external ports to the server management chip and create the server management network. The server management network can enable a remote computing device to access the server management chip from the number of external ports (e.g., multi-path network access).

FIG. 1 illustrates a flow chart of an example method 100 for providing a server management network internal to a computing device according to the present disclosure. The computing device can be a server (e.g., computing server, database server, file server, web server, etc.). The server management network can be a network subnet that connects a number of computing devices via a number of ports of the server with the server management chip of the server.

At 102, a plurality of network interface controllers (NICs) in the computing device are connected to a limited layer network device in the computing device via mutually isolated connections. The plurality of NICs can enable remote computing devices access to the computing device. For example, the computing device can be a server and the NICs can include a number of Ethernet ports that enable a number of remote computing devices to access a service provided by the server.

The limited layer network device can be a limited layer network switch with a number of capabilities that can be categorized by the open systems interconnection (OSI) model. For example, the limited layer network device can have a number of physical ports (e.g., Ethernet, Fibre Channel ports, OSI layer 1, etc.) that can connect a number of computing devices. The capabilities and/or functions of the limited layer network device can be performed by hardware within the limited layer network device and/or logic within the limited layer network device.

The limited layer network device can have a number of data link layer capabilities (e.g., OSI layer 2 capabilities). For example, the limited layer network device can process and transfer data (e.g., communication traffic, data packets, etc.) from a first computing device of the number of computing devices to a second computing device of the number of computing devices connected by the limited layer network device. In another example, the limited layer network device can use layer 2 (e.g., media access control (MAC)) addresses in connection with the transfer of the server management traffic to and/or from the server management chip.

The limited layer network device can have a number of network layer capabilities (e.g., OSI layer 3). For example, the limited layer network device can perform fragmentation and reassembly. In another example, the limited layer network device can report delivery errors to a connected computing device. Furthermore, the limited layer network device can use layer 3 (e.g., Internet Protocol (IP)) addresses to transfer server management traffic to and/or from the server management chip. For example, the limited layer network device can determine server management traffic from a layer 3 address and allow server management traffic to access the server management chip.

The limited layer network device can have a number of transport, session, presentation, and application layer capabilities (e.g., OSI layer 4). For example, the limited layer network device can generate a number of segments of data packets and keep track of the segments and retransfer a number of segments that fail to send or are not received. Furthermore, the limited layer network device can use layer 4 (e.g., port number) addresses to transfer server management traffic to the server management chip. For example, the limited layer network device can determine server management traffic from a layer 4 address and allow server management traffic to be transferred to and/or from the server management chip.

The limited layer network device can have a number of capabilities from various layers of the OSI model. In addition, the limited layer network device can provide a dynamic host configuration protocol (DHCP) for the server management chip. For example, the server management chip can have a designated address (e.g., internet protocol (IP) address, etc.) with a designated prefix to designate server management traffic. The designated IP address and designated prefix can enable the limited layer network device to restrict communication that is not server management traffic (e.g., non-server management traffic, traffic requesting service provided by server, etc.).

According to some examples of the present disclosure, the limited layer network device can connect each of the plurality of NICs to the server management chip and allow a number of remote computing devices access to the server management chip. The limited layer network device can restrict remote computing device communication (e.g., access) to the server management chip. For example, the limited layer network device can restrict communication that is not associated with the server management chip (e.g., non-server management traffic, traffic attempting to access a number of services provided by the server, etc.).

The limited layer network device can analyze and determine that particular traffic is server management traffic and transfer the server management traffic to the server management chip. For example, as described herein, the limited layer network device can utilize many capabilities to transfer traffic based on a number of qualities of the communication (e.g., MAC address, IP address, port number, etc.). The limited layer network device can utilize the number of qualities of the communication to determine server management traffic.

The server management chip can send a message to a number of network computing devices (e.g., computing devices within the same network, a number of servers within the same computing environment, a number of servers within the same performance optimized datacenter (POD), etc.). The message can be a broadcast to computing devices within the network. The message can include a designated address (e.g., IP address) for the server management chip. The message can include a signal to other network computing devices that the server management chip is included in the network and that the server management chip is utilizing the designated address.

The message can designate (e.g., request) a response by the number of network computing devices. For example, the response can include an acknowledgement of the server management chip. In another example, the response can confirm that other network computing devices within the number of network computing devices are utilizing the same address as the designated address. If a network computing device is already utilizing the designated address, the server management chip can be designated with a different address.

The broadcast of the designated address can ensure that the designated address of the server management chip is a unique address (e.g., a loop-free topology, an IP address that is not already utilized within a network, a non-duplicate IP address, etc.). The designated address can be utilized to restrict access to the server management chip. If the designated address is already in use within the network, a number of bridge loops can be created and a number of problems can occur (e.g., broadcast radiation, messages for the server management chip can be incorrectly sent, restrictions to the server management chip may not operate properly, etc.).

A number of protocol techniques (e.g., spanning tree protocol, spanning tree algorithm, master-slave order, etc.) can be used to ensure a loop-free topology. For example, a spanning tree protocol (STP) can be used to create a single active path between any two network nodes of a mesh network. For example, a number of network nodes can be a number of Ethernet ports that includes a first Ethernet port and a second Ethernet port. In this example, a STP can be used to ensure that there is only a single active communication path between the first Ethernet port and the second Ethernet port.

The server management traffic can include communication between the server management chip and a remote computing device. The remote computing device can be required to have access permissions. The access permissions can include, but are not limited to: a username/password combination, a virtual certificate downloaded to the remote computing device, etc.

The plurality of NICs can have mutually isolated connections to the limited layer network device. For example, each of the plurality of NICs can have a separate and distinct Ethernet connection with the limited layer network device. The mutually isolated connections can enable the limited layer network device to control the transfer of communication between the plurality of NICs as well as the communication between a number of remote computing devices and the server management chip.

The plurality of NICs can be distinct and unaware that the remaining number of NICs are present. For example, a first NIC of the plurality of NICs can function without any communication with a second NIC of the plurality of NICs. In another example, the first NIC of the plurality of NICs can have no information corresponding to the second NIC of the plurality of NICs being transferred via the first NIC of the plurality of NICs.

The limited layer network device can reject communication from a first NIC of the plurality of NICs to a second NIC of the plurality of NICs. For example, if there is a communication from a first NIC of the plurality of NICs to a second NIC of the plurality of NICs, the communication can be rejected and/or not be transferred through the limited layer network device. In this manner the limited layer network device can ensure that connections for the plurality of NICs remain isolated.

At 104, the limited layer network device is connected to a server management chip in the computing device via a connection isolated from the NICs. As described herein, the limited layer network device can transfer server management traffic to the server management chip via a connection with the limited layer network device.

The server management chip can be connected to the limited layer network device via an isolated connection (e.g., designated port on the limited layer network device). For example, an isolated connection can be an Ethernet connection (e.g., Ethernet port) on the limited layer network device that can comprise hardware and/or logic to allow server management traffic to be transferred from a number of ports that receive communication from the plurality of NICs. In another example, the isolated connection can be a different type of connection compared to the connection between the plurality of NICs and the limited layer network device. For example, the isolated connection that can be designated for the server management chip can transfer server management communications from the server management chip to a remote computing device via the plurality of NICs. In contrast, as described herein, the connection between the limited layer network device and the plurality of NICs can reject and/or not allow communication between the plurality of NICs.

The example of a method 100 described in FIG. 1 can be utilized as a system to ensure access to the server management chip even when a dedicated server management port is malfunctioning and/or not performing to industry standards. For example, a server may have a dedicated port (e.g., Ethernet port) that connects a number of remote computing devices to the server management chip. If the dedicated port malfunctions, a user of a remote computing device can access the server management chip via a non-dedicated port of the server without a reboot of the server or physical repair of the dedicated port. In this manner, the number of non-dedicated ports of the server can be utilized as a number of multi-ports (e.g., redundant ports, etc.) for the server management chip.

Figure 2:
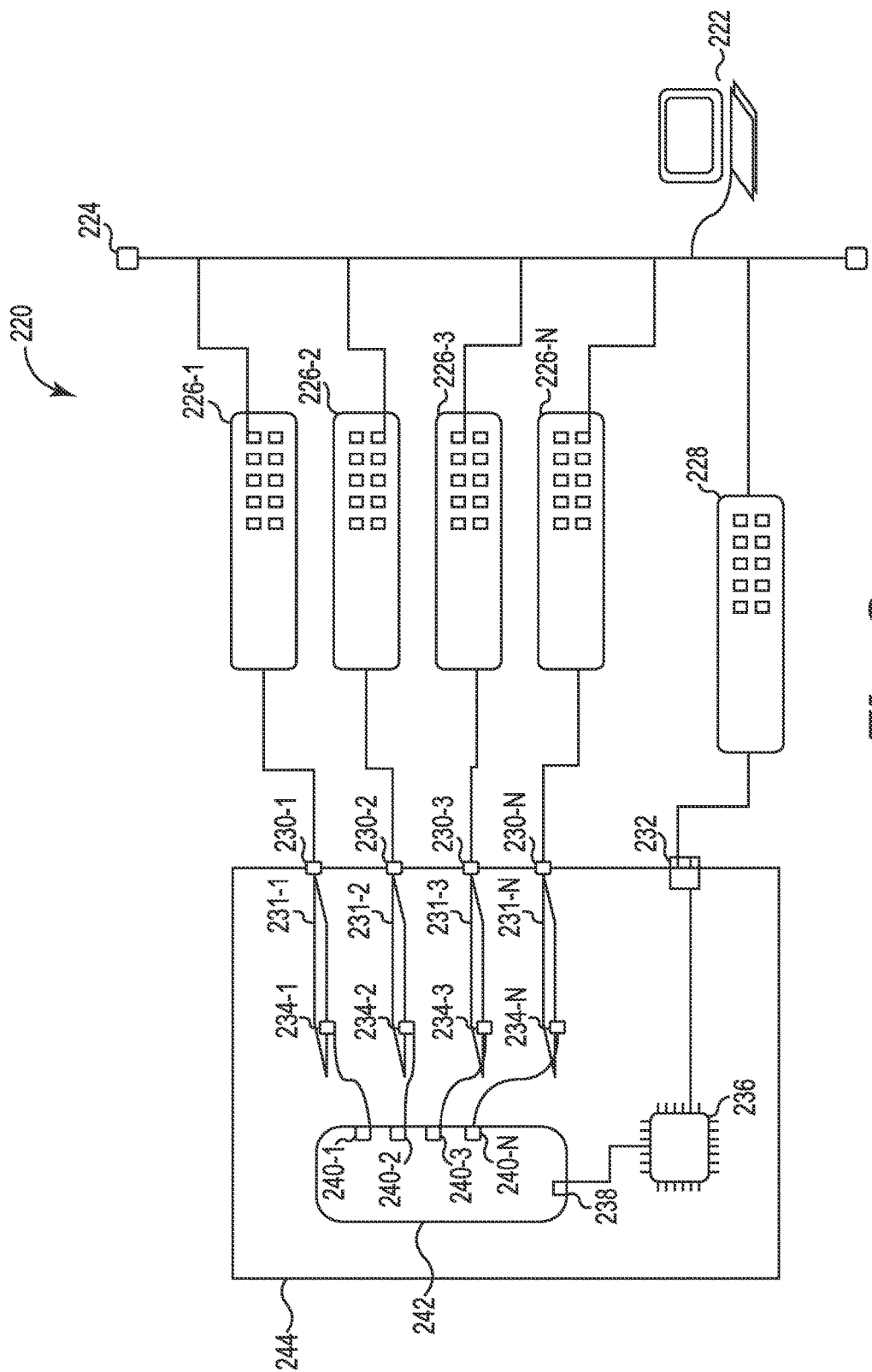
FIG. 2 illustrates a diagram of an example system for providing a server management network internal to a computing device according to the present disclosure.

FIG. 2 illustrates a diagram of an example system 220 for providing a server management network internal to a computing device 244 (e.g., server, etc.) according to the present disclosure. The computing device 244 can be a server. The computing server can provide a service to a number of remote computing devices 222.

The computing device 244 can include a server management chip 236 (e.g., out-of-band management chip, lights-out management (LOM) chip, iLO chip, etc.). The server management chip 236 can have a dedicated server management port 232 for connecting to a number of remote computing devices 222. The dedicated server management port 232 can be connected via a number of dedicated intermediate switches 228 (e.g., network devices) to a network 224 (e.g., local area network (LAN), wide area network (WAN), internet, etc.). The dedicated server management port 232 can be hard wired (e.g., printed circuit board (PCB), connected by circuitry, not removable, etc.) to the server management chip 236.

The number of dedicated intermediate switches 228 can control access to the dedicated server management port 232. For example, the number of remote computing devices 222 can be required to have a server management chip authorization (e.g., virtual certificate, username/password, etc.).

The server management chip 236 can be connected to a limited layer network device 242. The server management chip 236 can have a designated port 238 on the limited network device 242. The designated port 238 can have different limitations and capabilities compared to the number of limited layer network device ports 240-1, 240-2, . . . , 240-N that receive traffic from the number of NICs 231-1, 231-2, . . . , 231-N.

The computing device 244 can also include a number of NICs 231-1, 231-2, . . . , 231-N. The number of NICs 231-1, 231-2, . . . , 231-N can each include a corresponding external port 230-1, 230-2, . . . , 230-N. The external ports 230-1, 230-2, . . . , 230-N can be an Ethernet port utilized by a number of remote computing devices 222 connected via a network 224. The number of remote computing devices 222 can utilize a network 224 that can be connected to a number of access network switches 226-1, 226-2, . . . , 226-N. The number of access switches 226-1, 226-2, . . . , 226-N can be communicatively connected to the number of external ports 230-1, 230-2, . . . , 230-N. The number of access switches 226-1, 226-2, . . . , 226-N can also each be connected to the network 224.

The number of access switches 226-1, 226-2, . . . , 226-N can have a number of access restriction levels. For example, the number of access switches 226-1, 226-2, . . . , 226-N can allow all users access to the number of NICs 231-1, 231-2, . . . , 231-N. In another example, the number of access switches 226-1, 226-2, . . . , 226-N can allow a greater number of users access to the number of NICs 231-1, 231-2, . . . , 231-N compared to the number of users that can access the server management chip 236 via the number of dedicated switches 228.

The number of NICs 231-1, 231-2, . . . , 231-N can each include a corresponding internal port 234-1, 234-2, . . . , 234-N. The internal ports 234-1, 234-2, . . . , 234-N can be a port (e.g., Ethernet port) utilized to connect each of the number of NICs 231-1, 231-2, . . . , 231-N to a limited layer network device 242.

Each of the NICs 231-1, 231-2, . . . , 231-N can have an isolated connection with the limited layer network device 242. For example, the isolated connection of NIC 231-1 can comprise an Ethernet connection between internal port 234-1 and a limited layer network device port 240-1. The number of internal ports 234-1, 234-2, . . . , 234-N can be designated ports for the limited layer network device 242. For example, the number of NICs 231-1, 231-2, . . . , 231-N can have a plurality of ports that are each designated for a particular purpose. Furthermore, the number of external ports 230-1, 230-2, . . . , 230-N can be designated to connect to the network 224.

As described in FIG. 1, the limited layer network device 242 can include a number of capabilities to control traffic from the number of remote computing devices 222 to the server management chip 236. The system 220 can be utilized by a number of remote computing devices 222 to communicate with the server management chip 236 via the number of external ports 230-1, 230-2, . . . , 230-N. The system 220 can also be utilized as fail safe mechanism if the dedicated server management port 232 for the server management chip 236 is malfunctioning (e.g., disabled, not performing to manufacturer specifications, etc.).

If the dedicated server management port 232 for the server management chip 236 is malfunctioning, the remote computing device 222 can create a new connection with the server management chip 236 via one of the number of NICs 231-1, 231-2, . . . , 231-N. The new connection can be created without a reboot of the server 244 and/or without repair of the dedicated server management port 232.

The remote computing device 222 can designate a number of NICs 231-1, 231-2, . . . , 231-N as designated ports for a communication path with the server management chip 236. For example, the remote computing device 222 can designate each of the number of NICs 231-1, 231-2, . . . , 231-N as designated ports for a communication path with the server management chip 236.

In another example, the remote computing device 222 can designate a portion of the number of NICs 231-1, 231-2, . . . , 231-N for a communication path with the server management chip 236. For example, the portion of the number of NICs 231-1, 231-2, . . . , 231-N can include a single NIC 231-1 (e.g., 231-2, etc.) for a communication path with the server management chip 236. In this example, the NIC 231-1 can be the only NEC that can access and/or communicate with the server management chip 236. In this example, a number of users may not be able to access the server management chip via NICs 231-2, . . . , 231-N.

Figure 3:
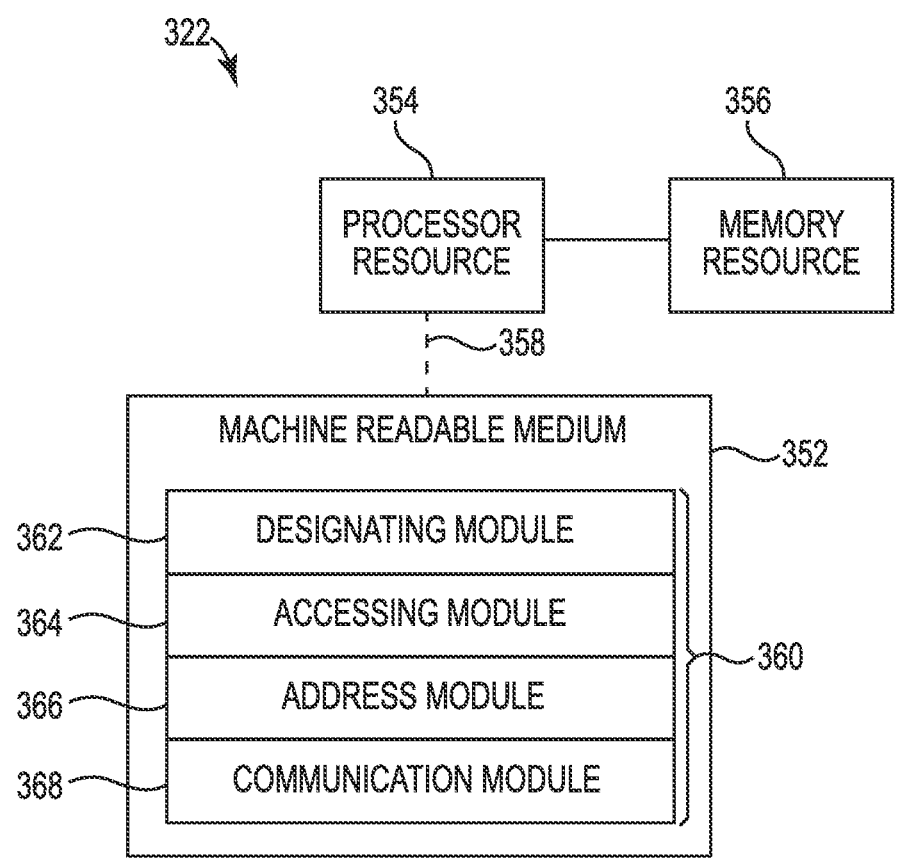
FIG. 3 illustrates a block diagram of an example of a computer-readable medium in communication with processing resources of a computing device.

FIG. 3 illustrates an example computing device 322 according to an example of the present disclosure. The computing device 322 can utilize software, hardware, firmware, and/or logic to perform a number of functions. The computing device 322 can include the number of remote computing devices as described in FIG. 2 at 222. The hardware of the computing device 322 can also include the computing device as described in FIG. 2 at 244.

The computing device 322 can be a combination of hardware and program instructions configured to perform a number of functions. The hardware, for example can include one or more processing resources 354, machine readable medium (MRM) 352, etc. The program instructions (e.g., computer-readable instructions (CRI) 360) can include instructions stored on the MRM 352 and executable by the processing resources 354 to implement a desired function (e.g., send communication to the server management chip, etc.).

MRM 352 can be in communication with a number of processing resources of more or fewer than 354. The processing resources 354 can be in communication with a tangible non-transitory MRM 352 storing a set of CRI 360 executable by one or more of the processing resources 354, as described herein. The CRI 360 can also be stored in remote memory managed by a server and represent an installation package that can be downloaded, installed, and executed. The computing device 322 can include memory resources 356, and the processing resources 354 can be coupled to the memory resources 356.

Processing resources 354 can execute CRI 360 that can be stored on an internal or external non-transitory MRM 352. The processing resources 354 can execute CRI 360 to perform various functions, including the functions described in FIG. 1 and FIG. 2.

The CRI 360 can include a number of modules 362, 364, 366, 368. The number of modules 362, 364, 366, 368 can include CRI that when executed by the processing resources 354 can perform a number of functions.

The number of modules 362, 364, 366, 368 can be sub-modules of other modules. For example the accessing module 364 and the communication module 368 can be sub-modules and/or contained within a single module. Furthermore, the number of modules 362, 364, 366, 368 can comprise individual modules separate and distinct from one another.

A designating module 362 can comprise CRI 360 and can be executed by the processing resources 354 to designate a number of NICs and or ports that can transfer communication to a server management chip. For example, the designating module can designate a particular (e.g., single) NIC that can allow communication between a number of remote computing devices and the server management chip.

An accessing module 364 can comprise CRI 360 and can be executed by the processing resources 354 to access the server management chip. For example, the accessing module 364 can insert a marker (e.g., IP address, MAC address, etc.) within a communication that can be recognized by a limited layer network device to authenticate the communication from the computing device 322.

An address module 366 can comprise CRI 360 and can be executed by the processing resources 354 to respond to a broadcast of a different computing device to recognize a new address of the device in the network and determine if the new address is the same as a current address of the computing device 322. For example, a server management chip can broadcast a designated IP address for the server management chip and the address module 366 can receive the broadcast and can respond to the server management chip.

A communication module 368 can comprise CRI 360 and can be executed by the processing resources 354 to send communication to a server management chip. For example, the communication can include instructions for the server management chip to perform a number of server functions (e.g., reset the server, power up the server, access server's integrated management log (IML), etc.).

A non-transitory MRM 352, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory MRM 352 can be integral, or communicatively coupled, to a computing device, in a wired and/or a wireless manner. For example, the non-transitory MRM 352 can be an internal memory, a portable memory, a portable disk, or a memory associated with another computing resource (e.g., enabling CRIs 360 to be transferred and/or executed across a network such as the Internet).

The MRM 352 can be in communication with the processing resources 354 via a communication path 358. The communication path 358 can be local or remote to a machine (e.g., a computer) associated with the processing resources 354. Examples of a local communication path 358 can include an electronic bus internal to a machine (e.g., a computer) where the MRM 352 is one of volatile, non-volatile, fixed, and/or removable storage medium in communication with the processing resources 354 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 358 can be such that the MRM 352 is remote from the processing resources e.g., processing resources 354, such as in a network connection between the MRM 352 and the processing resources (e.g., processing resources 354). That is, the communication path 358 can be a network connection. Examples of such a network connection can include a local area network (LAN), wide area network (WAN), personal area network (PAN), and the Internet, among others. In such examples, the MRM 352 can be associated with a first computing device and the processing resources 354 can be associated with a second computing device (e.g., a Java® server). For example, a processing resource 354 can be in communication with a MRM 352, wherein the MRM 352 includes a set of instructions and wherein the processing resource 354 is designed to carry out the set of instructions.

As used herein, "logic" is an alternative or additional processing resource to perform a particular action and/or function, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for providing a server management network internal to a computing device, comprising:
    connecting each of a plurality of network interface controllers (NICs) in the computing device to a limited layer network switch in the computing device via designated ports, the designated ports being mutually isolated connections; and
    connecting the limited layer network switch to a server management chip in the computing device via a connection isolated from the NICs, wherein the limited layer network switch restricts non-management traffic from a first NIC of the plurality of NICs to a second NIC of the plurality of NICs, and permits server management traffic from the first NIC of the plurality of NICs to the server management chip.

2. The method of claim 1, wherein the server management chip is connected to receive server management traffic from the limited layer network switch and a dedicated network port.

3. The method of claim 1, wherein the limited layer network switch restricts non-management traffic and permits server management traffic based on a designated address of the server management chip.

4. A computing device, comprising:
    a server management chip coupled to a dedicated server management port;
    a plurality of ports each having an external connection and an internal connection;
    a limited layer network switch coupled between the server management chip and the internal connection of each of the plurality of ports to transfer server management traffic from the plurality of ports to the server management chip and to restrict the transfer of non-server management traffic among the plurality of ports.

5. The computing device of claim 4, wherein the limited layer network switch transfers the server management traffic to the server management chip in response to a failure associated with the dedicated server management port and a connection between the dedicated server management port and the server management chip.

6. The computing device of claim 4, wherein the limited layer network switch transfers server management traffic from only one of the plurality of ports to the server management chip.

7. The computing device of claim 4, wherein the server management chip initiates a broadcast to determine if an Internet Protocol (IP) address for the server management chip is a unique IP address.

8. The computing device of claim 4, wherein the limited layer network switch uses a layer 3 address to transfer the server management traffic to the server management chip.

9. The computing device of claim 4, wherein the limited layer network switch provides a dynamic host configuration protocol (DHCP) for the server management chip.

10. The computing device of claim 4, wherein the plurality of ports are a plurality of multi-ports for the server management chip.

11. The computing device of claim 4, wherein the limited layer network switch restricts non-management traffic based on a designated address of the server management chip.

12. A computing device, comprising:
    a server management chip coupled to a dedicated server management port;
    a limited layer network switch communicatively connected to the server management chip; and
    a plurality of network interface controllers (NICs) each comprising a number of external ports and a designated port, wherein the designated ports are mutually isolated and each of the designated ports are individually connected to the limited layer network switch to transfer server management traffic from a number of external computing devices communicatively connected to the number of external ports, wherein the limited layer network switch restricts traffic between the plurality of NICs.

13. The computing device of claim 12, wherein the limited layer network switch transfers server management traffic to the server management chip if the dedicated server management port is disabled.

14. The computing device of claim 12, wherein a designated internet protocol is established for the server management chip.

15. The computing device of claim 12, wherein the limited layer network switch restricts traffic between the plurality of NICs based on a designated address of the server management chip.

* * * * *